UNITED STATES PATENT OFFICE.

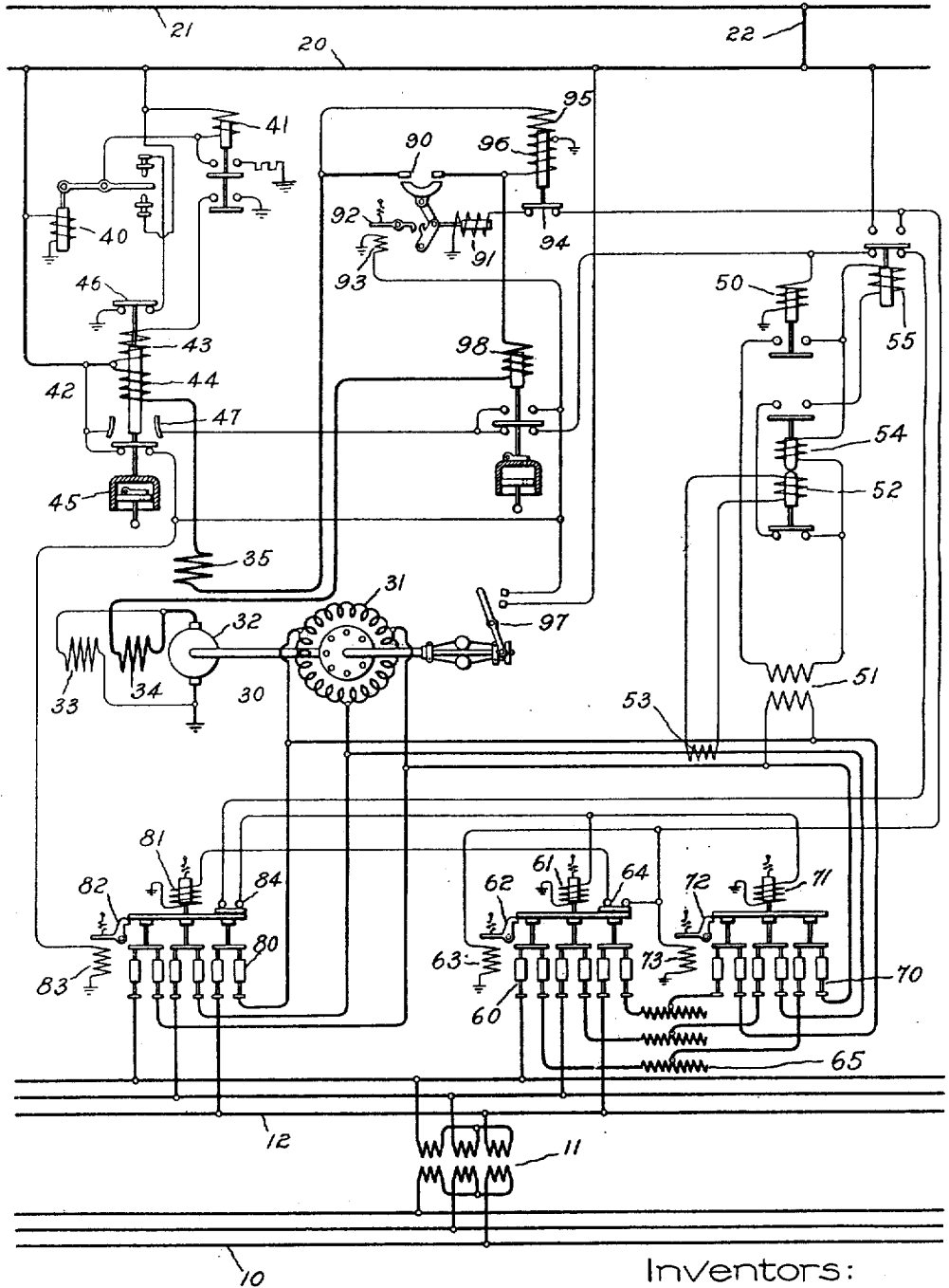

CLAUDE W. PLACE, OF ST. LOUIS COUNTY, MISSOURI, AND EDWARD TAYLOR, OF CHICAGO, ILLINOIS, ASSIGNORS TO GENERAL ELECTRIC COMPANY, A CORPORATION OF NEW YORK.

AUTOMATIC SUBSTATION.

1,237,953.     Specification of Letters Patent.     Patented Aug. 21, 1917.

Application filed June 25, 1915. Serial No. 36,219.

*To all whom it may concern:*

Be it known that we, CLAUDE W. PLACE and EDWARD TAYLOR, citizens of the United States, residing, respectively, in the county of St. Louis, State of Missouri, and at Chicago, in the county of Cook, State of Illinois, have invented certain new and useful Improvements in Automatic Substations, of which the following is a specification.

Our invention relates to automatic substations for interconnecting a supply circuit and a distribution circuit, and more particularly to a substation including a rotary transformer which is arranged to be started and stopped automatically in accordance with the varying demand on the distribution circuit.

In various cases, but notably in connection with electric railways, power is supplied from one or more sources by means of high voltage supply circuits, and is then transformed at substations for distribution to the translating devices; for example, to cars or locomotives. Since the power supply is commonly alternating current, and the distribution is by direct current, some sort of a rotary transformer is used to interconnect the two circuits. This machine is usually run continuously throughout the working day, and an attendant is provided who starts and stops the same at the beginning and end of the day. The schedule of operations, however, may only require that current be supplied for a few minutes at a time at intervals during the day; for example, once an hour. As a result, the light load loss of the machine continues over a considerable part of the day, when the substation is not needed.

It is, accordingly, the object of our invention to provide a substation which shall be entirely automatic, thus dispensing with any need for continuous attendance, and shall operate, in accordance with the load conditions of the distribution circuit, when it may be needed.

Our invention will be more readily understood from the following description when taken in connection with the accompanying drawing, in which the single figure is a diagrammatic view of such an automatic substation.

The supply circuit 10, here shown as a three-phase alternating current line, is connected with the alternating current bus bars 12 of the substation by means of a step-down transformer 11. If the substation be used to supply an electric railway, then the distribution circuit will consist of a trolley-wire 20, which will commonly be paralleled by a feeder 21 connected thereto at regular intervals by means of cross connections such as that shown at 22.

The remaining apparatus includes a rotary transformer adapted to be connected between the supply circuit and the distribution circuit, together with the necessary apparatus for controlling the same. In accordance with the usual practice, it will be suitably arranged within a building designed as a shelter and protection. In the arrangement shown, the rotary transformer 30 is indicated as a motor generator set comprising the alternating current motor 31, mechanically connected to, and here shown as mounted on the same shaft with, the direct current generator 32. This generator may be of any suitable type, and preferably will be a compound wound commutating pole machine. The shunt field winding 33 is connected directly across the brushes of the machine, one of which may be permanently connected to the return conductor of the railway system, and, consequently, is indicated as connected to ground. In series between the other brush and the distribution circuit there is arranged a series field winding 34 and a commutating field winding 35.

In accordance with our invention, this machine is arranged to be controlled automatically in such a manner that energy will be supplied to the distribution circuit at the desired time. As one means of effecting this automatic control, we have herein illustrated a contact-making voltmeter 40, so arranged that, when the trolley voltage decreases to a certain value,—for example, 400 volts—the movable arm of the voltmeter will touch the upper fixed contact, and when the trolley voltage reaches its desired value of, say, 550 volts, the movable arm will touch the lower fixed contact. The voltmeter relay 41 is arranged to be energized by the contact-making voltmeter under suitable conditions, and when energized will close the circuit of the potential coil 43 of a master relay 42. This master relay is designed to operate a double throw switch which in its upper position slidingly engages the spring contacts 47 and controls the starting of the rotary transformer and its connection to the supply and distribution circuits, and in its lower position controls the disconnection thereof from both circuits. The master relay is also provided with a current coil 44, so designed that when the power transferred by the rotary transformer exceeds a predetermined amount, the double throw switch will be held in its upper position, and when the power transferred falls below this value and remains below it for a predetermined time, fixed by the dashpot 45, the switch will fall to its lower position. This master relay is also provided with an interlock 46 in circuit with the upper contact of the contact-making voltmeter.

To assist in setting the rotary transformer in operation and connect the same to both the supply and distribution circuits, we have provided certain other relays. One of these, which may be termed the energizing relay 50, is closed when the master relay is brought to its upper position. This relay 50 closes the circuit from a potential transformer 51 through a relay 54. Arranged in suitable mechanical relation to the relay 54 is a retarding relay 52, which is connected across the terminals of the current transformer 53. When the retarding relay is strongly energized, it will assist the closing of the relay 54, but when less strongly energized will fall back to its original position, to close a circuit in series with the contacts of the relay 54. When the contacts of both relays 52 and 54 are closed, a switch-closing relay 55 will be energized from the potential transformer 51.

Under the control of these starting relays are various switches. One of these, the magnetizing switch 60, preferably constructed as an oil switch and provided with the closing coil 61, latch 62, and trip coil 63, is arranged to connect one terminal of the compensator 65 to the alternating current bus bars 12. Connected to the low voltage taps of this compensator is the starting switch 70, provided with a closing coil 71, latch 72, and trip coil 73, which when closed will supply a reduced voltage to the alternating current terminals of the rotary transformer. Obviously, any other well known form of rotary transformer might be substituted for the form here shown, but the substitution would be well understood by one skilled in the art, and further description thereof is not deemed here necessary.

A running switch 80, which is provided with a closing coil 81, latch 82, and trip coil 83, is arranged to connect the alternating current terminals of the rotary transformer directly to the bus bars 12. As will be seen from an inspection of the drawing, the circuit of the closing coils 61 and 71 is led through an interlock 84 which is only closed when the running switch 80 is in its open position. Similarly, the circuit of the closing coil 81 is led through an interlock 64 which is only closed when the magnetizing switch 60 is in its open position. The connection of the direct current terminals of the rotary transformer to the distribution circuit is effected by means of the line switch 90, which is provided with a closing coil 91, latch 92, and trip coil 93. The circuit of the closing coil 91 is controlled by means of a balanced relay 94. This relay 94 is provided with a coil 95 responsive to the voltage of the distribution circuit, and a coil 96 responsive to the direct current voltage generated by the rotary transformer. When these voltages are substantially equal the contacts will close.

Protection against accidents is secured by means of a speed control switch 97 and an overload relay 98. The speed control switch 97 is illustrated diagrammatically as centrifugally operated from the rotary transformer, and arranged to energize the trip coils of the running switch 80 and the line switch 90 when an excessive speed is attained. The overload relay 98 is arranged to be responsive to the power transferred by the rotary transformer, and when an excessive amount of power is transferred,—for example, because of a short circuit on the trolley—the upper contacts of this relay will be closed, and the trip coils 83 and 93 thereby energized. This relay in its lower position also controls the circuit established by the master relay 42 in its upper position. The raising of the overload relay 98 may be suitably delayed by means of a dashpot, so that the same will not be responsive to momentary overloads.

All of the relays and electromagnetic switches herein utilized are so designed that they will be operative over the desired voltage range, for example, from 300 to 600 volts, but will not be operative at excessively low voltages, such as 200 volts, which might be caused by an overload on the distribution circuit.

The relation of the various elements embodying our automatic substation will be best understood by considering the steps of its operation in actual practice. Let us suppose that the substation in question is used in connection with an electric railway system, and, as will be the case in actual practice, is situated at a considerable distance from the generating station which supplies said system. If, then, a car or train approaches the substation, the voltage on the trolley will be decreased because of the excessive line drop caused by the current delivered to said car over a long stretch of the distribution circuit. This decrease in voltage will cause the movable arm of the contact-making voltmeter to be moved against its upper fixed contact, and thereby energize the coil of the voltmeter relay 41 through the interlock 46 of the master relay. As soon as the relay 41 is energized it will establish a circuit by means of its upper set of contacts, which will hold it in closed position. At the same time, its lower set of contacts will energize the potential coil 43 of the master relay, and will thereby raise the same to its upper position. This movement of the master relay will energize the closing coils 61 and 71, and supply current at a reduced voltage to the alternating current terminals of the rotary transformer, thereby setting the same in motion. Coincidentally with the energization of these closing coils, the relay 50 will be raised, and this in turn, after the magnetizing and starting switches have been closed, will supply alternating current, through the potential transformer 51, to the relay 54. At the same time, the rush of current inherent in the starting of alternating current motors will, through the agency of the current transformer 53, strongly energize the retarding relay 52, which will assist the relay 54 to move to its upper position. So long as this rush of current continues, the closing of the relay 54 has no effect, but when it has ceased the contacts on the relay 52 will close and the relay 55 will be energized, thereby opening its lower contacts and closing its upper contacts. The opening of the lower contacts of the relay will deënergize the closing coils 61 and 71 and allow the springs which have been provided to pull open the switches 60 and 70 as soon as the latches thereon have been released. The closing of the upper contacts of the relay 55 will energize the trip coils 63 and 73 and thereby release said switches. It will also energize the closing coil 81 as soon as the interlock 64 has been closed by the opening of the magnetizing switch 60. This will close the running switch 80 and supply full voltage to the alternating current terminals of the rotary transformer. This machine will now come up to speed, and as soon as the voltage delivered at the direct current terminals thereof is practically equal to the line voltage, the balanced relay will drop and allow the relay 55 to energize the closing coil 91 of the line switch. This switch will be held in position by its latch 92 until the trip coil 93 is energized. The rotary transformer will now receive energy from the supply circuit and deliver it to the distribution circuit, thereby raising the voltage of said circuit to its normal value of, say, 550 volts. As soon as this voltage is attained, the movable arm of the contact-making voltmeter will touch its lower fixed contact, and thereby short-circuit the voltmeter relay 41, causing the same to drop. The dropping of this relay will deënergize the potential coil 43 of the master relay. Since, however, current is now being delivered through the coil 44 of the master relay, the double throw switch controlled thereby will be held in its upper position. This will continue so long as the passing car is within the zone to be supplied by this particular substation, and, as a consequence, the power transferred by the substation exceeds the predetermined value necessary for holding the master relay in its upper position. When the power transferred decreases below this value, the master relay will drop, bringing its double throw switch to its lower position. In order to allow for short stops of the train, this action may be suitably delayed for any desired interval by means of the dashpot 45, the closing circuit being maintained for a time by the sliding contacts 47. When said switch has reached its lower position, however, the trip coils 83 and 93 will be energized, and the connection of the rotary transformer to the supply circuit and the distribution circuit broken. The machine will thereupon come to rest, and the apparatus will be ready for a repetition of the above cycle when, owing to the schedule of the railway system, another car or train comes into the neighborhood of the substation, the voltage is again decreased considerably below its normal value.

If during the operation of the substation an excessive speed is attained, the switch 97 will act in the manner outlined above to prevent damage to the apparatus. Similarly, a sustained overload on the system will actuate the overload relay 98 to open the circuits leading to the rotary transformer. If, when the station is not in operation, a short circuit should be caused at some point on the distribution circuit, the voltage thereof will be greatly decreased. This, however, will be ineffective to set the substation into operation, because of the fact that the voltage will be so sharply decreased that it will be below the value necessary for the operation of the various relays involved, and will thereby prevent the substation from feeding current to this short circuit.

While we have herein shown and described one arrangement of apparatus for the practical operation of an automatic substation according to our invention, it will be understood that many modifications in the apparatus and the details of the arrangement thereof may be made without departing from our invention. We accordingly desire to cover in the appended claims all such modifications as fall within the true scope and spirit of our invention.

What we claim as new and desire to se- cure by Letters Patent of the United States, is:—

1. In combination, a supply circuit, a distribution circuit, a rotary transformer adapted to be connected between said circuits, means responsive to a decrease in the potential of said distribution circuit for connecting said transformer in circuit and responsive to a decrease in the power transferred by said transformer for cutting said transformer out of circuit.

2. In combination, a supply circuit, a distribution circuit, a rotary transformer, means for connecting the same to each of said circuits, an electromagnetically operated switch arranged to control both of said connecting means, means responsive to the voltage of said distribution circuit for closing said switch, and means responsive to the power transferred by the transformer for holding it closed.

3. In combination, a supply circuit, a distribution circuit, a rotary transformer, means for connecting the same to each of said circuits, means responsive to the voltage of said distribution circuit arranged to control each of said connecting means, and means responsive to the ratio of the distribution voltage and the rotary transformer voltage for also controlling the means which effects the connection to the distribution circuit.

4. In combination, a supply circuit, a distribution circuit, a rotary transformer, means for connecting the same to said circuits, a double throw switch controlling said connecting means normally biased to a position to open said connecting means, means responsive to the voltage of the distribution circuit for moving said double throw switch to its other position, means responsive to the power transferred by said transformer for holding said double throw switch in this position, and means for then automatically rendering the voltage responsive means ineffective.

5. In combination, a supply circuit, a distribution circuit, a rotary transformer, means for connecting said transformer to said supply circuit through a starting circuit, means for connecting said rotary transformer directly to said supply circuit, means responsive to the voltage of said distribution circuit for effecting the connection through said starting circuit, and means responsive to the flow of current through said starting circuit arranged to control said direct connecting means.

6. In combination, a supply circuit, a distribution circuit, a rotary transformer, means for connecting the same to said distribution circuit, means for impressing a reduced voltage thereon from said supply circuit, means for connecting said rotary transformer directly to said supply circuit, and means responsive to the flow of current through said reduced voltage connection controlling said full voltage connection and the connection to said distribution circuit.

7. In combination, a supply circuit, a distribution circuit, a rotary transformer, means for connecting the same to said distribution circuit, means for impressing a reduced voltage thereon from said supply circuit, means for connecting said rotary transformer directly to said supply circuit, means responsive to the flow of current through said reduced voltage connection controlling said full voltage connection and the connection to said distribution circuit, and means responsive to the ratio of the voltage delivered by said transformer to the voltage of the distribution circuit also controlling said latter connecting means.

8. The combination with a supply circuit and a distribution circuit, of an automatic substation for transferring power from one circuit to the other, comprising a rotary transformer, electromagnetic means for connecting the same to said circuits, a relay switch for energizing said means, a double throw electromagnetic switch responsive to the voltage of said distribution circuit, said double throw switch being arranged to energize said relay switch when the voltage is low, and to deënergize the same when the voltage is high.

9. The combination with an alternating current circuit and a direct current circuit, one being a supply circuit and the other a distributing circuit, of a rotary transformer adapted to be electrically connected therebetween and automatic means responsive to an electrical condition of the distribution circuit for starting the transformer from the supply circuit.

10. The combination with an alternating current circuit and a direct current circuit, one being a supply circuit and the other a distribution circuit, of a rotary transformer adapted to be electrically connected therebetween, and automatic means responsive to a decrease in the voltage of the distribution circuit for starting the transformer from the supply circuit.

11. The combination with an alternating current circuit and a direct current circuit, one being a supply circuit and the other a distribution circuit, of a rotary transformer adapted to be electrically connected therebetween, automatic means responsive to a decrease in the voltage of the distribution circuit for starting the transformer from the supply circuit, and automatic means for subsequently connecting the transformer to supply energy to the distribution circuit.

12. The combination with a supply circuit and a distribution circuit, of a rotary transformer adapted to be electrically connected therebetween, automatic means responsive to a decrease in the distribution circuit voltage for making connection between the transformer and the supply circuit, automatic means, responsive to an electrical condition of the transformer and the distribution circuit, for making connection therebetween whereby energy may be supplied from the transformer to the distribution circuit, and means for maintaining the said connections between the transformer and the supply and distribution circuits independently of the voltage of the last named circuit.

13. The combination with a supply circuit and a distribution circuit, of a rotary transformer adapted to be electrically connected therebetween, automatic means operable upon a decrease in the distribution circuit voltage for starting the transformer from the supply circuit, connecting the transformer to the distribution circuit and maintaining it in operation independently of the distribution circuit voltage, and automatic means responsive to the load upon the transformer for disconnecting the transformer from the distribution circuit.

14. The combination with a supply circuit and a distribution circuit, of a rotary transformer adapted to be electrically connected therebetween, automatic means operable upon a decrease in the distribution circuit voltage for starting the transformer from the supply circuit, connecting the transformer to the distribution circuit and maintaining it in operation independently of the distribution circuit voltage, and automatic means responsive to the load upon the transformer for disconnecting the transformer from the distribution and supply circuits.

15. The combination with a supply circuit and a distribution circuit, of a rotary transformer adapted to be electrically connected therebetween, automatic means operable upon a decrease in the distribution circuit voltage for starting the transformer from the supply circuit, connecting the transformer to the distribution circuit and maintaining it in operation independently of the distribution circuit voltage, and automatic means operable upon the load upon the transformer varying either above or below predetermined limits for disconnecting the transformer from the distribution and supply circuits.

16. The combination with a supply circuit and a distribution circuit, of a rotary transformer adapted to be electrically connected therebetween, automatic means operable upon a decrease in the distribution circuit voltage for starting the transformer from the supply circuit, connecting the transformer to the distribution circuit and maintaining it in operation independently of the distribution circuit voltage, and automatic means responsive to the speed of the transformer for disconnecting the transformer from the supply circuit.

17. The combination with a supply circuit and a distribution circuit, of a rotary transformer adapted to be electrically connected therebetween, automatic means operable upon a decrease in the distribution circuit voltage for starting the transformer from the supply circuit, connecting the transformer to the distribution circuit and maintaining it in operation independently of the distribution circuit voltage, and automatic means responsive to the speed of the transformer for disconnecting the transformer from the supply and distribution circuits.

18. The combination with a supply circuit and a distribution circuit, of a rotary transformer adapted to be electrically connected therebetween, automatic means operable upon a decrease in the distribution circuit voltage for starting the transformer from the supply circuit, connecting the transformer to the distribution circuit and maintaining it in operation independently of the distribution circuit voltage, and automatic means controlled by the load upon the transformer or the speed thereof for disconnecting the transformer from the supply and distribution circuits.

19. The combination with a supply circuit and a distribution circuit, of a rotary transformer adapted to be electrically connected therebetween, automatic means operable upon a decrease in the distribution circuit voltage for starting the transformer from the supply circuit, connecting the transformer to the distribution circuit and maintaining it in operation independently of the distribution circuit voltage, and automatic means controlled by the load upon the transformer or the speed thereof for disconnecting the transformer from the supply circuit.

20. The combination with a supply circuit and a distribution circuit, of a rotary transformer adapted to be electrically connected therebetween, automatic means operable upon a decrease in the distribution circuit voltage for starting the transformer from the supply circuit, connecting the transformer to the distribution circuit and maintaining it in operation independently of the distribution circuit voltage, and automatic means controlled by the load upon the transformer or the speed thereof for disconnecting the transformer from the distribution circuit.

In witness whereof, the parties hereto have respectively set their hands this 19th day of June, 1915, and this 22d day of June, 1915.

CLAUDE W. PLACE.
EDWARD TAYLOR.